Figure 1:
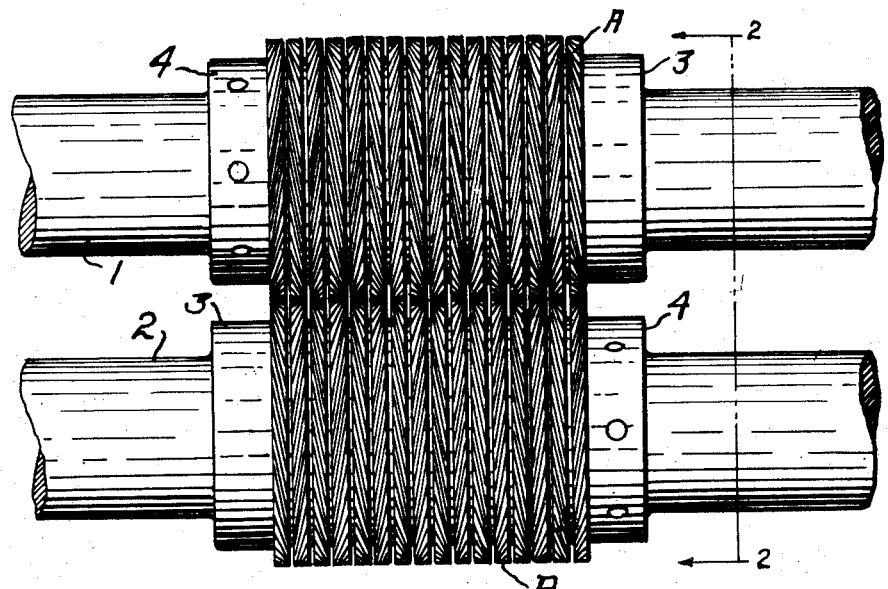

Dec. 23, 1930.  F. C. AREY  1,786,050
ROTARY SPIRAL SLITTING CUTTER
Filed July 28, 1927   2 Sheets-Sheet 1

INVENTOR.
Fred C. Arey.
BY
ATTORNEY.

Patented Dec. 23, 1930

1,786,050

UNITED STATES PATENT OFFICE

FRED C. AREY, OF OAK PARK, ILLINOIS, ASSIGNOR TO JOHN W. GLEASON, OF PITTSBURGH, PENNSYLVANIA; FRANK W. BORA, OF NEW YORK, N. Y.; WILLIAM F. FREUDENREICH, OF KENILWORTH, ILLINOIS; FREDERICK H. CHETLAIN, OF CHICAGO, ILLINOIS; AND HIMSELF, TRUSTEES

ROTARY SPIRAL SLITTING CUTTER

Application filed July 28, 1927. Serial No. 208,917.

The present invention, specifically considered, relates to rotary slitting cutters having spirally arranged cutting elements of the type illustrated in my prior Patent No. 1,834,376, dated July 12, 1921, and has for its object to improve the manner of assembling the various parts and indexing the cutting elements.

Cutters of this type comprise cutter units composed of segmental cutting elements spaced apart from each other by spacing segments, the cutter units alternating with spacing collars that define the width of the unslitted zones in the sheet operated upon by the cutting device. In my aforesaid patent the arbor on which the other parts are mounted has equally spaced longitudinal grooves cut in its periphery so that, in cross section, it resembles a gear wheel; and the cutting segments have toothed inner edges for interlocking engagement with the arbor. The cutting segments are therefore indexed from and driven by the arbor. In the making of plain diamond mesh expanded metal it is common practice to slit the sheets with rotary cutters that form slits parallel to the long edges of the sheets and, after such slitting cutters have become worn to such an extent that they can no longer be used for the normal purpose, it has heretofore been necessary to discard them. However, the cutting elements of these latter rotary slitters are suitable for use in spiral cutters if they can be refinished and assembled in a manner that will not be too expensive. These old cutting elements have unserrated inner edges and it would therefore be necessary to cut teeth into such inner edges before they could be used in the specific cutter device shown in my aforesaid patent.

One of the objects of the present invention is so to arrange the elements constituting a rotary slitter having spirally arranged cutting elements, that the cutting elements need not be interlocked with the supporting arbor and therefore need not have serrated inner edges; whereby the cutters of that type of rotary cutting device in which the cutting edges lie in planes at right angles to the axis of rotation may readily be modified for use in a spiral cutter.

Figure 2:
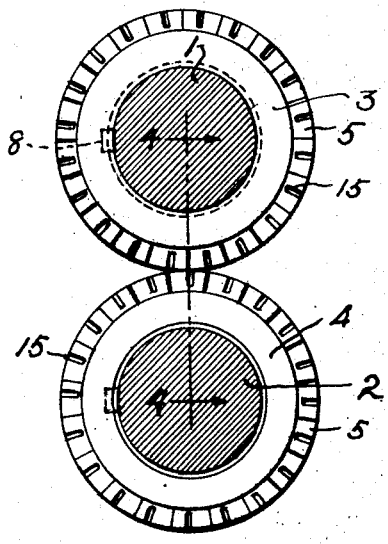
Figure 3:
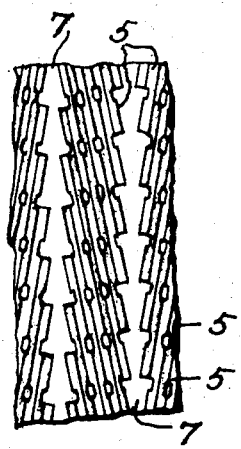
Figure 4:
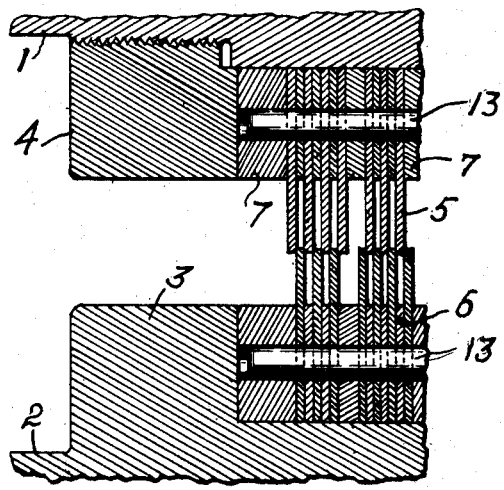
Figure 5:
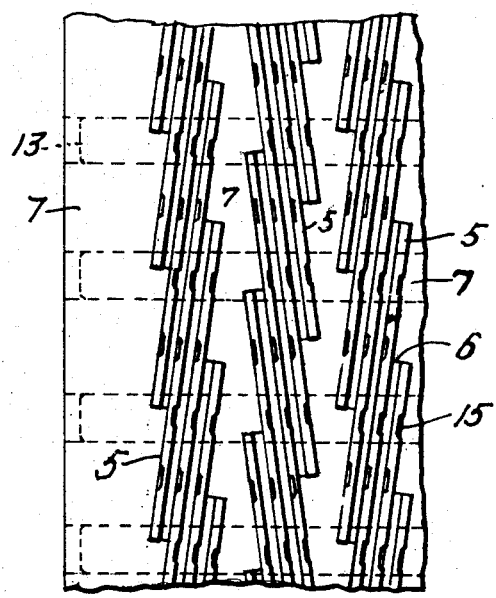
Figure 6:
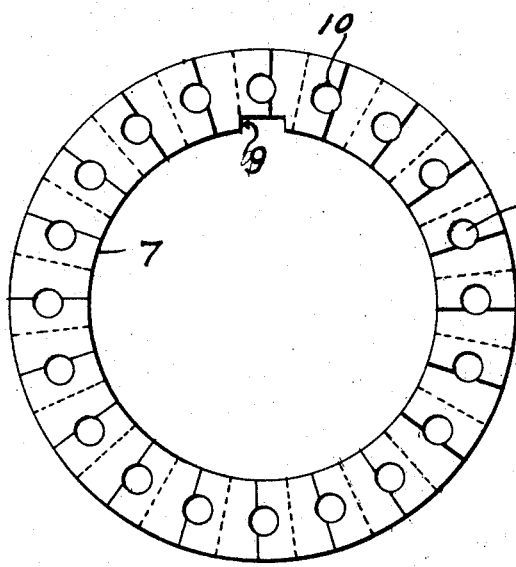
Figure 7:
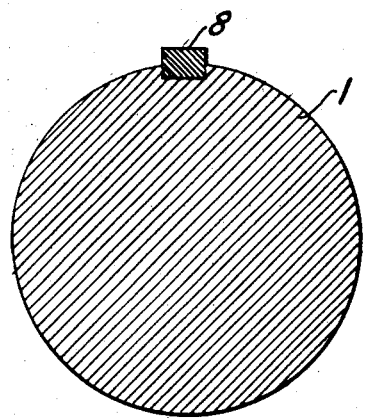
Figure 8:
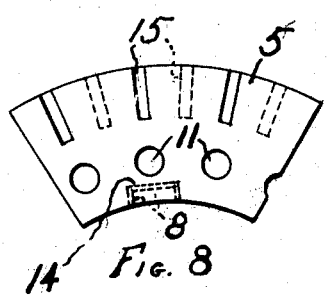
Figure 9:
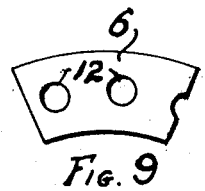

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is an elevation of two cooperating rotary slitting cutting devices embodying the present invention; Fig. 2 is a section taken approximately on line 2—2 of Fig. 1; Fig. 3 is a developed view of a fragment of one of the rotary cutters, showing in solid black the corresponding cutting elements of the cooperating cutter; Fig. 4 is a section taken approximately on line 4—4 of Fig. 2, on a larger scale; Fig. 5 is a developed view of a portion at one end of one of the cutters; Fig. 6 is a side view of one of the collars that alternate with the cutter units; Fig. 7 is a cross section through the arbor; Fig. 8 is a side view of one of the cutting segments; and Fig. 9 is a side view of one of the spacing segments that alternate with the cutting segments.

Referring to Figs. 1, 2 and 4 of the drawings, 1 and 2 represent two parallel arbors each having thereon a stationary flange or annular shoulder 3 and a nut 4. The elements corresponding to the cutter device on each arbor as indicated at A and B, are clamped between the flanges and nuts. As in my aforesaid patent, the cutter heads proper are made up of cutting segments 5, of which one is shown in Fig. 8, spacing segments 6, as shown in Fig. 9, and spacing collars 7. The arbors may be plain cylinders having a longitudinal key 8. Each collar is provided with a keyway 9 to receive the projecting portion of the key on the arbor, thereby permitting the collar to be moved freely lengthwise of the arbor while interlocked therewith against rotation thereon. Each collar is provided with a series of holes 10 extending through the same, the holes being equally spaced. The cutting segments are comparatively short and are provided with holes 11 whose centers are located in an arc of a circle of the same diameter as the circle containing the centers of the holes in the collars, and are spaced at the same distance apart as the centers of the holes in the collars. The small spacing segments that are placed between cutting segments of each ring-like band of cutting elements are also provided with holes 12 whose spacing is the same as the spacing of the holes 10 and 11. When the collars, the cutting segments, and the spacing segments are assembled in proper angular positions relatively to each other, the holes or openings 10, 11 and 12 will register with each other and form long cylindrical passageways parallel to the axis of the arbor. Long pins 13, as best shown in Fig. 4 are inserted in these passages, thus locking all of the segments to the collars and affording a driving connection between the collars and the cutter sections. Furthermore, the holes or openings and pins constitute indexing means by which the various cutter segments are located in proper relation to each other.

It will thus be seen that the arbors drive the collars, whereas the collars in turn drive the cutter segments which may be entirely loose on the arbors. In order to permit a continuous key to be employed to lock the collars to the arbor, those segments that overlie the key should have notches cut into their inner edges, as indicated at 14 in Fig. 8 for the purpose of clearing the key; the notches being wider and deeper than the projecting portions of the key so that the latter will not interfere with the proper indexing of the segments overlying the same.

Except for the differences in the manner of mounting the same, the cutter segments and the spacing segments, as well as the collars, may take the same forms as the corresponding elements in my aforesaid patent, and no detailed description of the same need be given here; it being sufficient to say that the side faces of the collars are given a step formation that determines the angle at which the segments lie, and that the cutting segments have the usual radial slots 15 to form breaks in the slits and leave portions that will afterwards form bonds between the strands in the expanded sheet. The relation of the cutter elements in the cooperating cutter devices is indicated diagrammatically in Fig. 3 in which is shown in a developed form a fragment of the periphery of one of the cutting devices, whilst interposed in the spaces between consecutive cutter segments thereof are the cooperating segments of the other device or head, shown in solid black.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In a rotary slitting cutter, an arbor, a plurality of collars slidably fitted upon the arbor and each keyed thereto to prevent relative rotary movements between the collars and the arbor, said collars having a series of registering openings extending through the same parallel to the long axis of the arbor and spaced at equal distances apart from each other, cutter units abutting against the arbor alternating with the collars and having openings registering with the aforesaid openings, and long pins extending through the openings in the collars and in the cutter units to lock the collars and cutter units together and index the cutter elements of said units.

2. A rotary slitting cutter comprising an arbor, collars slidable lengthwise of the arbor and keyed thereto against rotation thereon, cutter units alternating with the collars and each consisting of a ring composed of many cutting segments lying at an acute angle to a plane at right angles to the long axis of the arbor together with spacer segments between the cutting segments, there being numerous equally spaced openings extending through the collars and the cutter units parallel with said axis, pins extending through said openings to interlock the collars and cutter units and index the cutting segments, and means to clamp the collars and cutters against movement lengthwise of the arbor.

3. A rotary slitting cutter comprising an arbor, collars slidable lengthwise on the arbor and each interlocked therewith to prevent relative rotary movements, cutter units surrounding the arbor and alternating with said collars, each cutter unit comprising a series of segments lying at an acute angle to the long axis of the arbor together with spacers between said segments, said spacers and segments having aligned holes bored through the same parallel with the long axis of the arbor, said collars having holes of the same size as those in the segments and spacers, and pins fitted into said holes, each pin extending through at least one of the cutter units and into corresponding holes in collars lying on opposite sides of such unit.

In testimony whereof, I sign this specification.

FRED C. AREY.